(12) United States Patent
Royon

(10) Patent No.: US 10,454,818 B2
(45) Date of Patent: Oct. 22, 2019

(54) CCN NAME CHAINING

(71) Applicant: Telefonaktiebolaget LM Ericsson (publ), Stockholm (SE)

(72) Inventor: Yvan Royon, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 30 days.

(21) Appl. No.: 15/855,957

(22) Filed: Dec. 27, 2017

(65) Prior Publication Data

US 2018/0139126 A1    May 17, 2018

Related U.S. Application Data

(62) Division of application No. 14/796,881, filed on Jul. 10, 2015, now Pat. No. 9,887,913.

(51) Int. Cl.
| | | |
|---|---|---|
| *H04L 12/717* | (2013.01) | |
| *H04L 29/06* | (2006.01) | |
| *H04L 29/08* | (2006.01) | |
| H04W 80/04 | (2009.01) | |
| H04W 88/16 | (2009.01) | |
| H04L 29/12 | (2006.01) | |

(52) U.S. Cl.
CPC .......... *H04L 45/42* (2013.01); *H04L 63/0414* (2013.01); *H04L 67/327* (2013.01); *H04L 61/301* (2013.01); *H04L 63/0442* (2013.01); *H04W 80/04* (2013.01); *H04W 88/16* (2013.01)

(58) Field of Classification Search
CPC ............. H04L 2012/5608; H04L 45/54; H04L 49/3009; H04L 12/5601; H04L 49/309; H04L 47/621; H04L 45/74; H04W 84/12; H04W 88/08; H04W 80/04; H04W 8/26; H04W 88/06; H04W 84/18; H04W 74/08
USPC .... 370/310.2, 349, 328, 338, 395.31, 395.3, 370/395.32
See application file for complete search history.

(56) References Cited

U.S. PATENT DOCUMENTS

| | | | |
|---|---|---|---|
| 2012/0155348 A1* | 6/2012 | Jacobson | H04L 12/10 370/311 |
| 2013/0282854 A1* | 10/2013 | Jang | H04L 67/10 709/213 |
| 2014/0146819 A1* | 5/2014 | Bae | H04L 67/327 370/392 |
| 2015/0032892 A1 | 1/2015 | Narayanan et al. | |
| 2016/0105394 A1* | 4/2016 | Rangarajan | H04L 61/302 709/223 |

OTHER PUBLICATIONS

Arumaithurai, et al., "Exploiting ICN for Flexible Management of Software-Defined Networks," ACM, ICN'14, Sep. 24-26, 2014, Paris, France, 10 pages.

(Continued)

*Primary Examiner* — Brenda H Pham
(74) *Attorney, Agent, or Firm* — NDWE, LLP

(57) ABSTRACT

A method and system for route transforming by a network device implements a content centric networking (CCN) gateway or CCN router, where the CCN gateway or CCN router is part of a CCN network. The method to handle a first CCN reply before forwarding a second CCN reply in the CCN network. The method includes receiving the first CCN reply including a second CCN Name, applying a transform configuration to the second CCN Name to obtain CCN reply data, and generating a second CCN reply using the CCN reply data and a first CCN Name from a pending interest table (PIT) entry for the first CCN Name.

20 Claims, 10 Drawing Sheets

(56) References Cited

OTHER PUBLICATIONS

Chaabane, et al., "Privacy in Content-Oriented Networking: Threats and Countermeasures," ACM SIGCOMM Computer Communication Review, vol. 43 (3), Jul. 2013, pp. 25-33.
Dibenedetto, et al., "ANDaNA: Anonymous Named Data Networking Application," Jan. 10, 2012, 18 pages.
Garcia-Luna-Aceves, J.J., "Name-Based Content Routing in Information Centric Networks Using Distance Information," ACM, ICN'14, Sep. 24-26, 2014, Paris, France, 10 pages.
Mosko, "CCNx Publisher Clock Time Versioning draft-mosko-icnrg-timeversion-00," Internet Engineering Task Force, Internet-Drafts, Jan. 2015, pp. 1-5.
Mosko, et al., "CCNx Messages in TLV Format, draft-mosko-icnrg-ccnxmessages-01 ," ICNRG Internet Draft, IETF Trust, Mar. 9, 2015, 32 pages.
Mosko, et al., "CCNx Semantics, draft-mosko-icnrg-ccnxsemantics-01 ," ICNRG Internet Draft, IETF Trust, Mar. 2015, 24 pages.
Mosko, et al., "ICN "Begin-End" Hop by Hop Fragmentation, draft-mosko-icnrg-beginendfragment-00," ICNRG Internet Draft, IETF Trust, Jul. 2, 2015, 21 pages.
Mosko, M., "CCNx Publisher Serial Versioning, draft-mosko-icnrg-ccnxserialversion-00," ICNRG Internet Draft, IETF Trust, Jan. 9, 2015, 9 pages.
Mosko, M., "CCNx Content Object Chunking, draft-mosko-icnrg-ccnxchunking-01 ," ICNRG Internet Draft, IETF Trust, Jul. 1, 2015, 13 pages.
Mosko, M. "CCNx End-To-End Fragmentation, draft-mosko-icnrg-ccnxfragmentation-01 ," ICNRG Internet Draft, IETF Trust, Jul. 1, 2015, 14 pages.
Mosko, M., "CCNx Label Forwarding (CCNLF), ccnx-mosko-labelforwarding-01 ," Internet Draft, Palo Alto Research Center, IETF, Jul. 21, 2014, 8 pages.
Mosko, M., "Labeled Content Information, draft-mosko-icnrg-ccnxlabeledcontent-01 ," ICNRG Internet Draft, IETF Trust, Jun. 30, 2015, 16 pages.

* cited by examiner

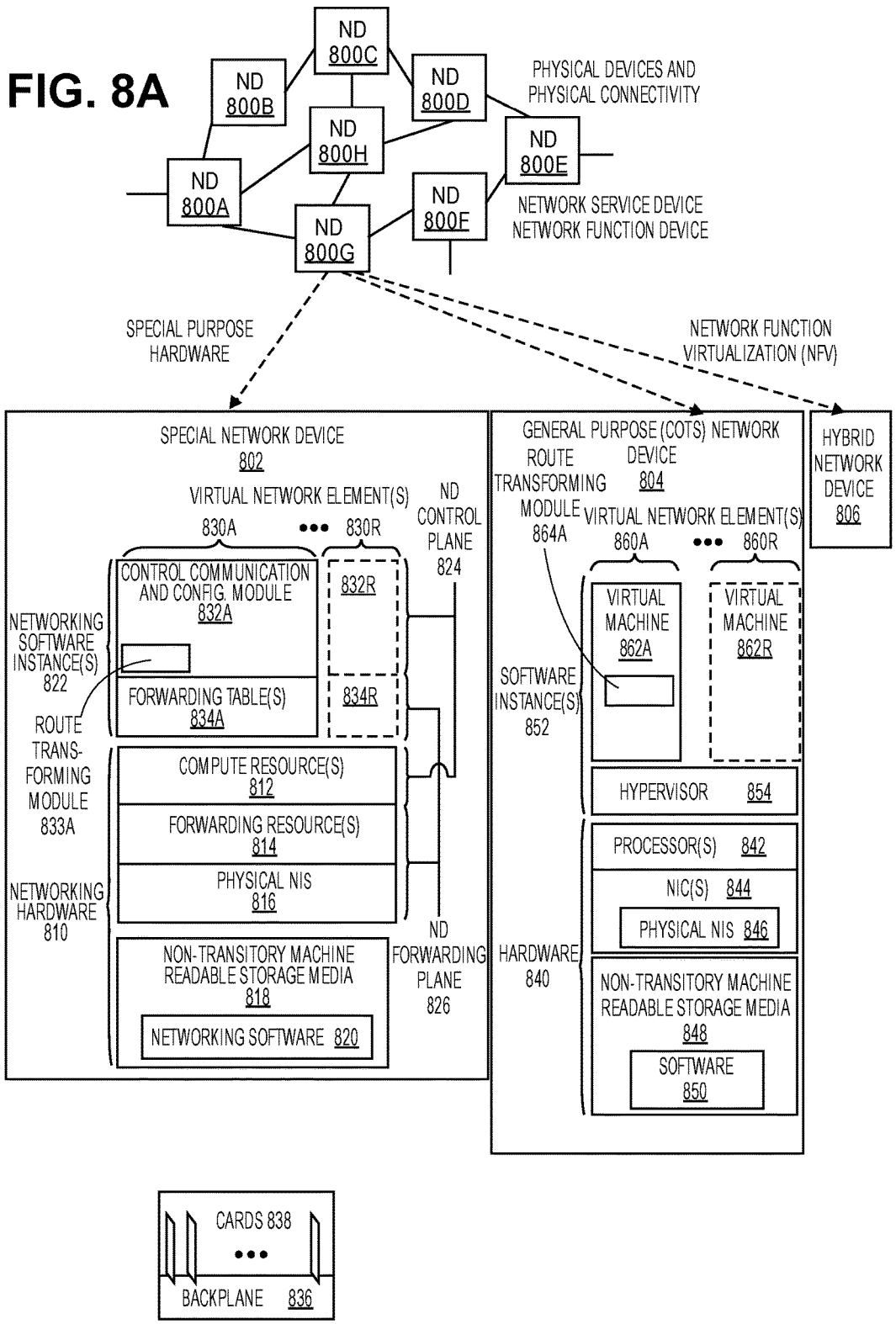

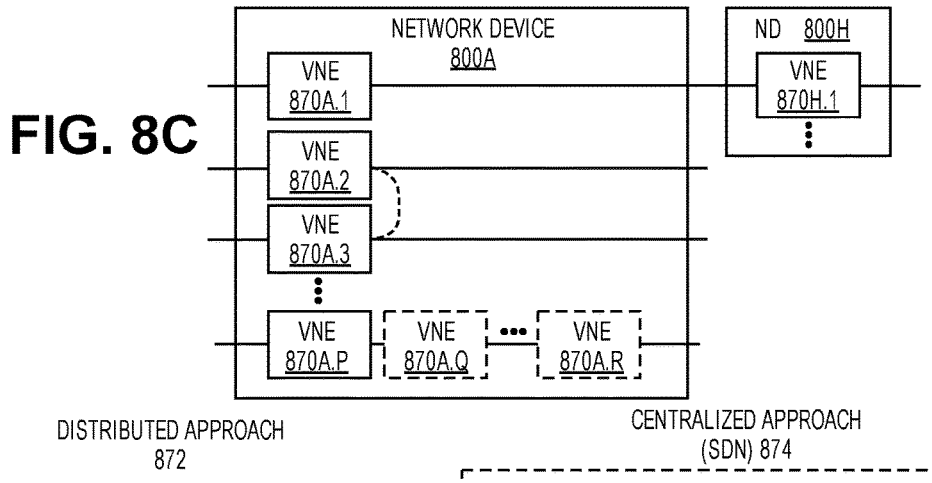
FIG. 8C
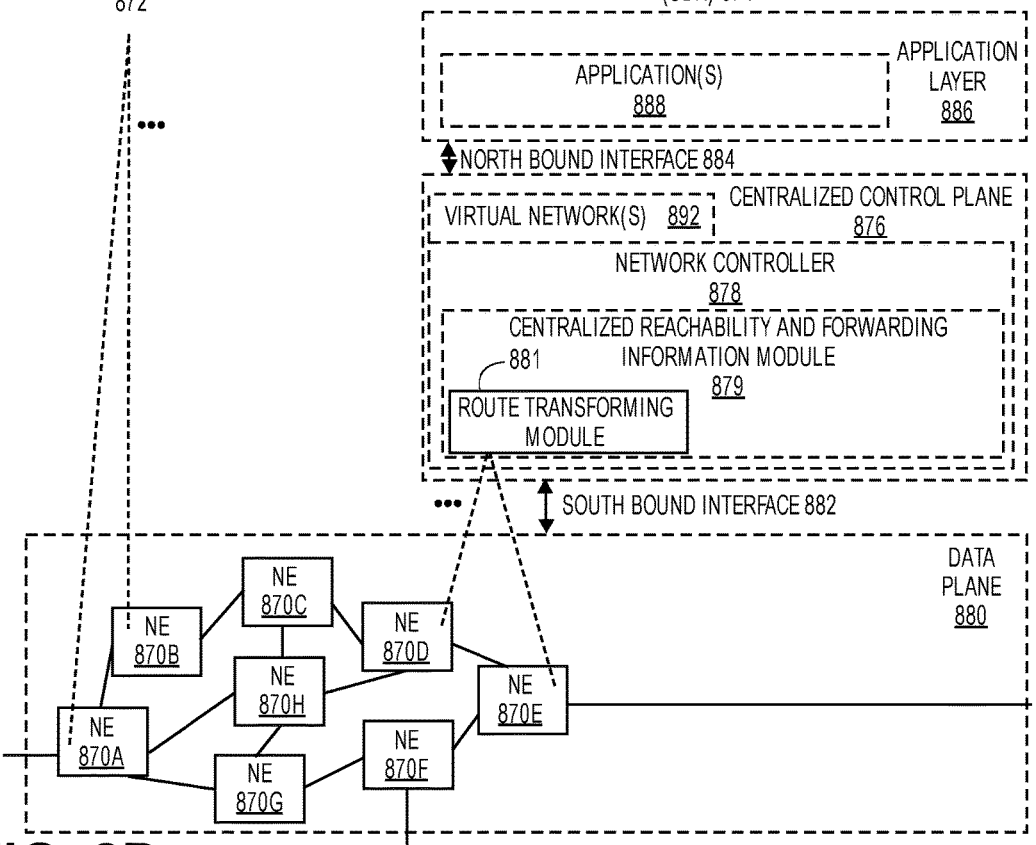
FIG. 8D
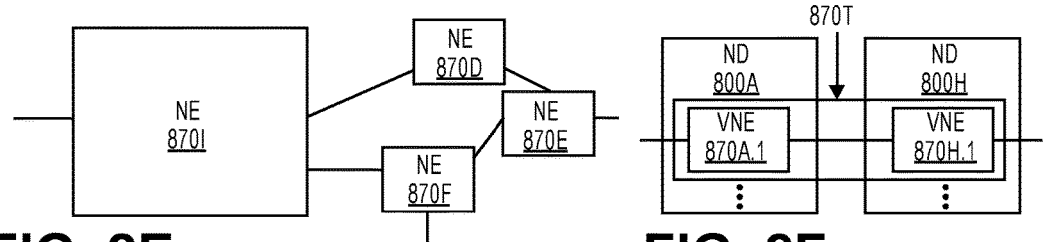
FIG. 8E
FIG. 8F

CCN NAME CHAINING

CROSS-REFERENCE TO RELATED APPLICATIONS

This application is a divisional of application Ser. No. 14/796,881, filed Jul. 10, 2015 (now U.S. Pat. No. 9,887,913, issued Feb. 6, 2018), which is hereby incorporated by reference.

FIELD

Embodiments of the invention relate to a process and apparatus to enable the renaming of content objects in information centric networking (ICN) networks such as content centric networking (CCN) networks. Specifically, the embodiments relate to a method and system implemented by a route transformer in a CCN router to process a CCN request, transform the CCN name, and forward a new CCN request with the transformed CCN name, as well as service the associated CCN reply to relay the CCN reply toward the originator of the CCN request. This functionality can be applied to provide proxy services, privacy and security functions, service chaining and related functions in the ICN network.

BACKGROUND

An ICN network is a conceptualization of a networking protocol stack, in particular layers 3 and above of a network protocol stack. The CCN network as well as similar networks like named data networking (NDN) networks are particular architectures and implementations of an ICN network. ICN, CCN, and NDN networks are based on the premise of naming resources in these networks. In particular, the naming relates to the use of a globally shared namespace for objects that allows entities in these networks to retrieve any content of interest. NDN networks and CCN networks have similar architectures, and for sake of clarity, examples related to CCN networks are discussed herein below.

Thus, within a CCN network, a name is utilized to identify a content object instead of an Internet Protocol (IP) address of the host of the content. In an IP network, routing is based on host names (e.g., source and destination addresses). In a CCN network by contrast, routing is based on a uniform resource identifier (URI) or similar identifier for a content object referred to as a CCN Name. CCN routing is performed hop-by-hop, using longest prefix matching on the CCN Name. All communications seeking to access data are framed as a request and response transaction. A CCN client (e.g., executed by user equipment) sends a message referred to herein as a CCN request to the nodes in the CCN network. The nodes of the CCN network respond with a CCN reply including a content object identified by a content object name in the CCN request also referred to as a CCN interest. The content object name can be a part of the CCN Name that also includes prefixes that provide a path to the content object. These content objects are returned via a CCN reply.

All content object packets are cryptographically signed by their initial provider. A CCN client can thus verify the integrity and authenticity of the content even if the packet comes from untrusted links or untrusted hosts. As a direct effect, CCN nodes in the CCN network are allowed to cache packets locally in a table called the content store. When a CCN node receives a CCN request, the CCN node can check whether its local content store has the requested content object and, if so, can send the content object to the requesting CCN client. The lookup in the content store is by the content object name. If the content object name is not found in the local content store, then the CCN request is forwarded according to entries for the content object name in a forwarding information base (FIB) of the CCN node.

The content object names and sometimes the CCN Names that identify the content objects are typically set by the original provider such as the content server. The routable prefixes that are joined with the content object names to form the CCN Names can be decided by a third party similar to the domain name service (DNS) system. However, the CCN Name is readable by anyone able to listen on the underlying links, whether the payloads of the packets of the CCN request and CCN reply are encrypted or not. This is different from tunnels in an IP context (e.g., IPsec and TLS) where the endpoints are readable by everyone, but the contents including for example hypertext transfer protocol (HTTP) URIs are not readable.

SUMMARY

In one embodiment, a method for route transforming by a network device implements a content centric networking (CCN) gateway or CCN router, where the CCN gateway or CCN router is part of a CCN network. The method handles a first CCN reply before forwarding a second CCN reply in the CCN network. The method includes receiving the first CCN reply including a second CCN Name, applying a transform configuration to the second CCN Name to obtain CCN reply data, and generating a second CCN reply using the CCN reply data and a first CCN Name from a pending interest table (PIT) entry for the first CCN Name.

In another embodiment, a network device implements the method for route transforming. The network device is in a CCN gateway or CCN router, where the CCN gateway or CCN router is part of a CCN network. The method handles a first CCN reply before forwarding a second CCN reply in the CCN network. The network device includes a non-transitory computer-readable medium having stored therein a route transforming module, and a processor coupled to the non-transitory computer-readable medium. The processor is configured to execute the route transforming module, the route transforming module configured to receive the first CCN reply including a second CCN Name, to apply a transform configuration to the second CCN Name to obtain CCN reply data, and generate a second CCN reply using the CCN reply data and a first CCN Name from a PIT entry for the first CCN Name.

In a further embodiment, a computing device executes a plurality of virtual machines for implementing network function virtualization (NFV), wherein a virtual machine from the plurality of virtual machines is configured to implement a method for route transforming. The computing device is in the CCN gateway or CCN router, where the CCN gateway or CCN router is part of a CCN network. The method handles a first CCN reply before forwarding a second CCN reply in the CCN network. The computing device includes a non-transitory computer-readable medium having stored therein a route transforming module, and a processor coupled to the non-transitory computer-readable medium, the processor configured to execute the virtual machine, the virtual machine configured to execute the route transforming module, the route transforming module configured to receive the first CCN reply including a second CCN Name, to apply a transform configuration to the second CCN Name to obtain CCN reply data, and generate a second CCN reply using the CCN reply data and a first CCN Name from a PIT entry for the first CCN Name.

In another embodiment, a control plane device configured to implement a control plane of a software defined networking (SDN) network including a plurality of network devices forming a content centric network. The control plane device implements a method for route transforming. The control plane device is in communication with the CCN gateway or CCN router, where the CCN gateway or CCN router is part of a CCN network. The method to handle a first CCN reply before forwarding a second CCN reply in the CCN network. The control plane device includes a non-transitory computer-readable medium having stored therein a route transforming module, and a processor coupled to the non-transitory computer-readable medium, the processor configured to execute the route transforming module. The route transforming module is configured to receive the first CCN reply including a second CCN Name, to apply a transform configuration to the second CCN Name to obtain CCN reply data, and generate a second CCN reply using the CCN reply data and a first CCN Name from a pending interest table (PIT) entry for the first CCN Name.

BRIEF DESCRIPTION OF THE DRAWINGS

The invention may best be understood by referring to the following description and accompanying drawings that are used to illustrate embodiments of the invention. In the drawings:

FIG. 8A illustrates connectivity between network devices (NDs) within an exemplary network, as well as three exemplary implementations of the NDs, according to some embodiments of the invention.

FIG. 8B illustrates an exemplary way to implement the special-purpose network device according to some embodiments of the invention.

FIG. 8C illustrates various exemplary ways in which virtual network elements (VNEs) may be coupled according to some embodiments of the invention.

FIG. 8D illustrates a network with a single network element (NE) on each of the NDs of FIG. 8A.

FIG. 8E illustrates an example where each of the NDs implements a single NE (see FIG. 8D), but the centralized control plane has abstracted multiple of the NEs in different NDs into a single NE in one of the virtual network(s) of FIG. 8D, according to some embodiments of the invention.

FIG. 8F illustrates a case where multiple VNEs are implemented on different NDs and are coupled to each other, and where the centralized control plane has abstracted these multiple VNEs such that they appear as a single VNE within one of the virtual networks of FIG. 8, according to some embodiments of the invention.

DETAILED DESCRIPTION

Figure 1:
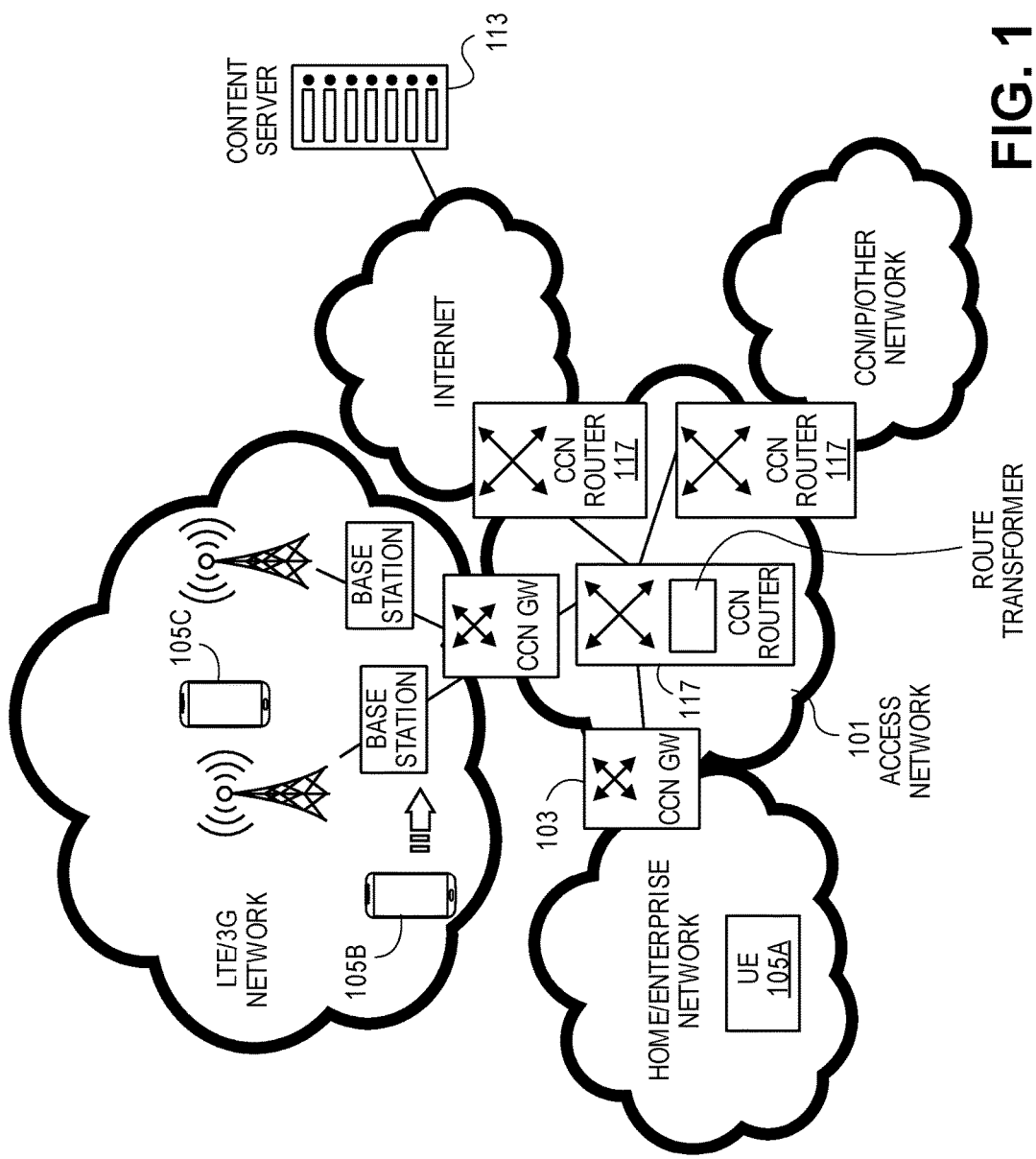
FIG. 1 is a diagram of one embodiment of a CCN network including placement of CCN gateways, CCN routers and content servers in the CCN network.

The following description describes methods and apparatus for implementing a process for transforming CCN names referred to as "route transforming." The embodiments introduce the concept of route transforming modules in a CCN network. These are components of CCN routers or virtual CCN routers that are identified by a regular CCN Name prefix and can be reached using regular CCN routing rules. Instead of treating the CCN Name as a static entity, these route transforming modules process and modify the CCN Name components to create a new CCN Name. The route transforming modules will attempt to obtain the content object using the newly transformed CCN Name from the CCN network by sending a new CCN request with the new transformed CCN name, and the CCN reply will be returned from the CCN network and again transformed by the route transforming module before being sent back in response to the original requestor's CCN request. The route transforming modules keep track of pending CCN requests involving transformations using extra fields in their local pending interest table (PIT). Using this idea of route transforming modules in the CCN network, the embodiments enable services like proxying, service-chaining, and policy-based routing. In addition, the CCN Names in CCN requests and CCN replies can be kept private via the private key infrastructure (PKI) already deployed in the CCN network.

References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Information Centric Networks

FIG. 1 is a diagram of one example of an architecture of a content centric networking (CCN) network. The CCN network in this example is an access network 101. The access network 101 is in communication with a set of separately administered networks including a home/enterprise network, the Internet and an LTE/3G mobile network. The example shows that the access network can be further in communication with any number of additional CCN networks, IP networks or other types of networks. In this example, the CCN network implements the route transforming processes described further herein below and is provided by way of example and not limitation. A CCN network can be utilized in other contexts such as home networks, enterprise networks, or similar independently administered public or private networks.

The access network can have any number of nodes and can utilize any combination of layer 1 and layer 2 protocols for communication between the CCN nodes of the access network 101. For sake of clarity, the nodes implementing the route transforming system are shown and described. The CCN nodes are network devices (ND), as discussed further herein below. The CCN nodes include a set of CCN routers 117 and CCN gateways (GW) 103. The CCN routers 117 manage CCN requests, also referred to as interest packets, forwarding these CCN requests toward the corresponding content server 113 and managing the content response messages, referred to as CCN replies, by forwarding them toward the requesting user equipment 105A-C.

The CCN nodes that communicate with the user equipment 105A-C in the separately administered networks are the CCN gateways 103. The user equipment 105A-C can be any type of user device including mobile devices, laptop computers, desktop computers, console devices, workstations and similar computing devices. In some embodiments, the CCN gateways 103 or routers 117 can implement a route transforming process via a route transforming module or by functioning as a route transformer that modify CCN Names before forwarding them toward a content server 113 and into the access network 101, functioning as a CCN network. The route transforming module or route transformer also handles the CCN reply from the CCN network or content server 113 to redirect the CCN reply toward the requester such as the user equipment 105A-C by reversing the transformation of the CCN Name.

The content server 113 can be any computing device in communication with the access network 101. The access network 101, functioning as a CCN network, can be in communication with any number and variety of content servers 113. The access network 101 can include any number of CCN gateways 103 and CCN routers 117 that can connect to any number of other networks or servers such as content servers 113. The content server 113 can be a server or similar computing device that hosts a set of services and resources such as data stores including web pages, audio/visual content, documents and similar static and/or dynamically generated data.

In one embodiment, the access network can be connected to home/enterprise networks or LTE/3G networks that include any number of user equipment 105A-C and other intermediate nodes. In an example application of the route transforming process, the user equipment 105B in an LTE or 3G network can originate a request for a content object provided by a content server 113. The request can be processed at a base station or similar intermediate device that generates a CCN request that designates the route transformer to handle the CCN request by prefixing the route transformer to the content object name to form the CCN Name. The route transformer removes the prefix to form a new CCN Name and a new CCN request that is sent toward the server. In this manner the nodes between the base station and route transformer can be excluded from access to the standard CCN Name and this provides a type of tunneling and proxy infrastructure with a variety of applications for the CCN network. The CCN router similarly handles the CCN reply from the content server 113 or the access network 101 to 'reverse' the transformation of the CCN Name such that it can be routed back toward the base station that originated the CCN request and ultimately to the originating user equipment 105B. One skilled in the art would understand that the route transforming process can be applied to other cases and scenarios and that this embodiment is provided by way of example and not limitation.

Figure 2:
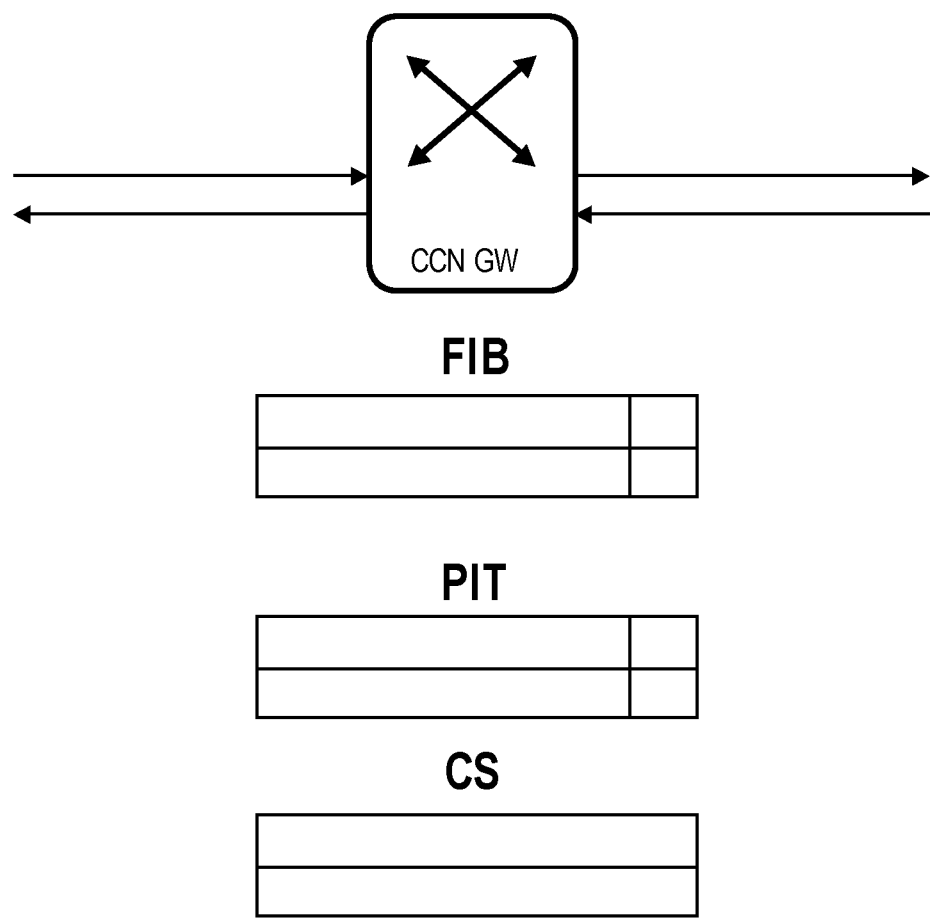
FIG. 2 is a diagram of one embodiment of an example set of data structures maintained by a CCN gateway or router node.

FIG. 2 is a diagram of one embodiment of the set of data structures maintained by CCN nodes. The CCN nodes such as CCN routers and CCN gateways maintain three or more sets of tables for tracking information related to CCN. In prior systems, only three tables were typically maintained. The existing CCN tables include the forwarding information base (FIB), the pending interest table (PIT) and the content store (CS). In some embodiments, additional data structures for assisting with cache management or route transforming can be present. The FIB is equivalent to the routing table in IP, where destination addresses and networks for particular content objects identified by CCN Names and content object names are matched with an output interface. In CCN, the IP prefixes utilized for matching on the routing table are replaced with content name prefixes of the CCN names.

The PIT stores the CCN requests that have been received at an ingress port of the CCN node, but that have not been responded to yet. The entries of these CCN requests are referred to as 'pending interests' and are removed from the PIT when a corresponding content object in a CCN reply is sent toward the originating user equipment that generated the CCN request that was received via the associated ingress port or when the pending interest times out. For nodes implementing route transforming the PIT can be modified to include additional information about the pending interests including fields to associate a received CCN Name with a transformed CCN name as well as transform configuration information that identifies the manner that a CCN name was transformed or provides information on how to 'reverse' the transformation when a CCN reply is received such that the requested content object can reach a desired destination. That destination can be any destination not just an originator of a CCN request. The transform configuration can provide this information to transform the CCN Name of the CCN reply. In other embodiments, instead of expanding the PIT an additional data structure is provided to relate the CCN Names with transformed CCN Names and to store the transform configuration.

The CS is an optional local cache of content objects. This cache is optional and can have any size or store any number of content objects. CCN nodes can choose not to cache anything (for example in a core network where cache size would need to be huge in order to maximize cache hits). In one embodiment, the CS stores a set of recently received content objects.

Each CCN node also provides a set of network interfaces also referred to as "faces" over which CCN requests are received and forwarded and similarly over which CCN replies are received and forwarded. In the example illustration, the CCN node includes three network interfaces, which are faces 1, 2, and 3. These network interfaces can represent a physical link or a Layer 2 interface. The network interfaces can also represent, in some embodiments, a transport protocol such as TCP/IP (in overlay mode) or even an application.

The basic data traffic forwarding in CCN is typically performed as explained below with an example sequence:

1. A CCN request arrives through a face (network interface).
2. The CCN node checks whether it has the requested content object stored in its CS.
3. If the content object is found in the CS, then go to step 7.
4. If the content object is not found in the CS, then a check is made whether the same content has already been requested, by looking for a PIT entry that matches the content object name.
5. If a matching PIT entry is found, then update the matching PIT entry by adding the network interface through which the CCN interest was received. In this case, the process then exits.
6. If no matching PIT entry is found, then a new entry is created in the PIT for the content object name, and the CCN request is forwarded toward the content server according to CCN name prefix matching using the FIB.
7. When a content object arrives through a network interface in a CCN reply, then forward the CCN reply to each of the network interfaces listed in the related PIT entry. If the content object was found in the content store, then forward it in a CCN reply to the network interface over which the corresponding CCN request was received.

This describes the basic process which is modified for route transforming as discussed further herein below.

In the IP networks of the prior art, the IP networks are structured such that a single IP node that can be referred to as a packet gateway performs the role of gateway to the IP network, such as an access or operator network. In these architectures, all the data traffic will go through this packet gateway. For instance, in mobile networks, as mentioned above, there is always a serving gateway and Packet Data Network (PDN) gateway (also known as EPG, Evolved Packet Gateway) that are the only entry/exit points of the access network to other networks such as the Internet. This creates a single point for various types of policy enforcement, but at the same time, this is a bottleneck for the network.

Issues Addressed by the Embodiments

As discussed above the prior art has many disadvantages. CCN Names are typically set by the original provider. Routable prefixes may be decided by a third-party akin to the DNS system. There are two primary issues that are addressed by the embodiments: (1) privacy and information leaks (e.g., CCN Names are not secure), and (2) client-driven Names (a mix of source-based routing and service chaining for CCN). The embodiments thus overcome the disadvantages of the prior art as further discussed herein below.

Privacy

An example case is described to illustrate the issues in the prior art with privacy and information leaks, where providers and consumers of some data or service decide to implement security measures. CCN strongly suggests that all content object packets are signed by the original provider. This provides integrity in that it proves the content was not tampered with and authenticity in that it proves the content was provided by a specific party (i.e., whoever holds the private key). However, other security properties are absent in CCN, such as client authentication, authorization, and especially confidentiality. Those can actually be implemented as protocols on top of CCN, just like transport layer security (TLS) provides those security properties on top of transport control protocol (TCP).

In regard to confidentiality, it is desirable that only the explicitly intended receivers can read the content of data transmissions. A piece of content, such as a content object, can be encrypted by the original provider, so that only nodes (e.g., routers, clients) holding the corresponding key may decrypt it and make any sense of it. However, the piece of content is only the payload in a CCN reply. This leaves exposed other information in the CCN reply such as the CCN Name.

CCN Names are used by forwarders throughout the CCN network to perform routing. So they typically need to be readable by ever node. This means eavesdroppers can see the CCN Name of data being requested and being sent back. Even without access to the (encrypted) data itself, this constitutes an information leak. For illustration, if a user is checking the balance from the bank account of the user, valuable information may be provided by the CCN Name. The bank application utilized by the user sends a CCN request with the CCN Name: /TheBank/customer=JohnDoe/account=supersavings/transactions/2001/April.

An eavesdropper can see that a person called John Doe has a Super-Savings account with the fictional The Bank Corporation, and that the person called John Doe was probably using the Super-Savings account back in April 2001. The CCN Name also gives a clue for what type or even value the data could be, which may help an attacker break the encryption scheme.

In another example, a person called John Doe wants to purchase Ericsson stocks: then a CCN request with a CCN Name like /TheBroker/customer=JohnDoe/buy/stock=ERIC/amount=500 may be generated. The eavesdropper now holds supposedly private information about Doe's assets. Finally, if someone living in a repressive state is trying to access censored news information then a CCN request with a CCN Name like /FreeSpeechJournal/articles/2015/January/headlines may be generated.

Again, this constitutes an information leak. By itself, it may not be enough as an attack vector against a person or an institution, but it may contribute to it. Scammers, phishers, crackers, or otherwise malevolent entities tend to be imaginative in how to exploit such information.

To be fair, an eavesdropper in CCN may only know that a CCN request or reply transited through the link they are eavesdropping on. The CCN requests and replies do not contain enough information to find out who initially sent the request. However, one can easily imagine a wide deployment of eavesdropping devices close to the edge and capillary networks, which may be enough to narrow down potential "culprits." Also, the CCN Name itself may be enough for the information leak, without knowing who actually sent the request, such as in the banking example above. This illustrates an example case that confidentiality is essential for many online activities, and that CCN Names should be covered by said confidentiality.

Client-Driven Naming

CCN has no equivalent for functions commonly seen in IP networks such as proxies, gateways or tunnels. In the current scheme, CCN Names are chosen by the original content providers, perhaps guided by the yet undefined CCN equivalent of Internet Corporation for Assigned Names and Numbers (ICANN). Route entries are chosen by network operators; they may for example associate /TheBank to different destinations (physical links) if the CCN request comes from the East Coast or the West Coast (e.g., for load balancing).

The client, or the node initiating a CCN request, chooses which CCN Name to request, but has no control over the structure of the CCN Name or the routing path. In the IP world, clients can set up tunnels, for example, a virtual private network (VPN) can be utilized to guarantee confidentiality between two specific endpoints. In another example, a proxy can be used to steer traffic through a specific location (e.g., geographic or corporate). CCN needs a way to provide similar features. The present embodiments offer a single mechanism for both tunneling and confidentiality at the CCN layer.

Route Transforming Mechanism

CCN (and NDN) routing relies on using a hierarchical naming scheme. The routing components in the hierarchical name allow routers in the CCN network to do hop-by-hop routing to direct the request to the requested object, and set up a reverse path to deliver the actual content object to the requestor.

For example, a requestor may want to access a CCN Name: /ericsson/presentations/2014/april/21/pres.ppt. This hierarchical path represents a route inside the Ericsson domain pointing to a presentation available on Apr. 21, 2014, in a file named pres.ppt. An important observation is that the CCN Name carried in the CCN request is static (i.e., not modified on-the-fly), and a longest-prefix matching is done on the CCN router's FIB table to decide upon a routing action.

In the embodiments, the notion of virtual entities in the network that can perform route transformations to obtain the content object of interest is introduced. These route transformers are identified using a corresponding prefix, for example, /route-transformer in the following example CCN name, /route-transformer[/inner/name].

The basic routing name in this scheme consists of a regular, routable CCN Name (/inner/name), prepended by another regular, routable CCN Name (/route-transformer).

As a further example in the CCN Name /my/isp/proxy[/ericsson/presentations/2014/april/21/pres.ppt], the Internet Service Provider's (ISP's) proxy is the "route-transformer" here, and the remainder of the CCN Name is the actual CCN Name for the content object that the user is interested in querying. In this case, the proxy here identifies the transformation, and requests the content object pres.ppt based on its hierarchical CCN route set forth in the remainder of the CCN Name. Once the object is retrieved, the proxy will send back a reply with the original requested CCN Name written for the CCN object. This will allow the CCN request and CCN reply to follow regular CCN routing rules.

The embodiments enhance the CCN routing namespace with routing components that can engage in CCN Name transformation (or re-writing). For example, "/proxy/" can be a routable component in the CCN Name that can transform (or re-write) the following route components in the CCN Name: /proxy/[/ericsson/presentations/2014/april/21/]. It is to be noted that the square brackets are for illustration only to identify the standard CCN Name.

The above-mentioned CCN Name can reach CCN routers that deal with the routable name "/proxy." Because "/proxy" is a transformation function in the namespace, the corresponding route transformer will attempt to rewrite the CCN Name based on the route following it, for example to generate the CCN Name [/ericsson/presentations/2014/april/21/].

A route transformer that is available in the CCN namespace performs the following actions upon receipt of a CCN request (original including the CCN Name) that is of the form /route-transformer/Data, where/route-transformer is a route transformer identifier that enables the CCN network nodes to identify and forward the CCN request to the corresponding route transformer (which may implement a route transforming module) in the CCN network.

(1) Generate a PIT entry for/route-transformer/Data and noting the incoming interface;

(2) Process the CCN request and extract the "Data" portion of the received CCN Name;

(3) Apply the route transformation function of the route transformer to the "Data" portion of the CCN Name which produces a "Transform configuration," and a new CCN Name that can be referred to as the "transformed-name" or transformed CCN name;

(4) Generate a new CCN request with the CCN Name "transformed-name" by the route transformer.

(5) Generate, in the PIT table (or the additional data structure for information pertaining to the transformation), a new entry which is a tuple linking ("original CCN Name," "transformed CCN name," and "transform configuration"). All information pertaining to the transformation is an addition to the present embodiments to the conventional PIT. This process is further described in regard to FIG. 3 herein below.

A similar process is applied upon receipt of a CCN reply. The route transformer processes a CCN reply in a typical fashion with some changes to accommodate the route transforming process.

(1) A check is made against the extended PIT table (or the additional data structure for information pertaining to the transformation) to see if a "transformed CCN name" is matched with the CCN name of the CCN reply.

(2) If a match is found then depending on the route transformer functionality, it will optionally apply the transform configuration also identified in the extended PIT entry (or the additional data structure entry) to the CCN Name or the received data portion of the CCN reply. For example, an extra level of data encryption can be implemented.

(4) A new CCN reply is generated for the original CCN Name, and attached is the new transformed data object. If there is no application of the optional transformer configuration, then it can be considered the identity function.

(5) The newly constructed CCN reply is forwarded into the local stack; there must be an existing PIT entry for the original CCN Name that will process this CCN reply, and send it along the reverse path to the requestor in the CCN network. This process is further discussed herein below with regard to FIG. 4.

Figure 3:
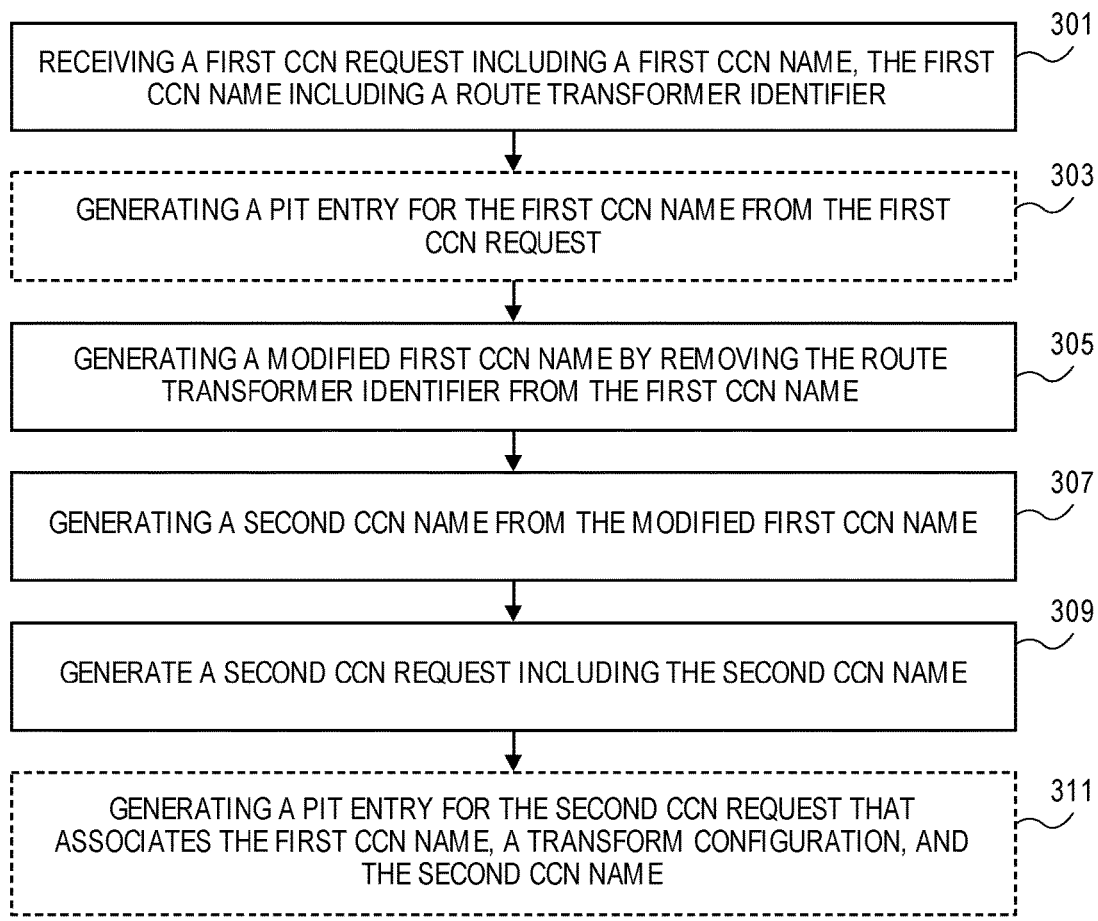
FIG. 3 is a flowchart of one embodiment of a process for a CCN router to perform a route transforming process on a CCN request.

FIG. 3 is a flowchart of one embodiment of a process for a CCN router to perform a route transforming process on a CCN request. In one embodiment, this process is carried out when any CCN request is received that includes a route transformer identifier. In many embodiments, the route transformer identifier is a prefix identifying the route transformer.

The process can be initiated when a CCN node, such as a CCN gateway or router that implements a route transformer, such as via a route transforming module, receives a first CCN request including a (first) CCN Name, where that (first) CCN Name includes a route transformer identifier (Block 301). The route transformer identifier can be a prefix in the CCN Name that is associated with the route transformer and which may have been utilized to route the CCN request to the route transformer. For example, as discussed above the CCN Name can have the format/route-transformer/data where the /route-transformer is the route transformer identifier and the /data is a data portion that identifies a requested content object. As discussed further herein below, a CCN name can identify a route transformer in other manners and can identify multiple route transformers along a path since the CCN Name is being used with prefixes to define an explicit path.

After receiving the first CCN request, a PIT entry for the received (first) CCN Name from the received first CCN request may optionally be generated (Block 303). The PIT entry can be a standard PIT entry with the CCN request added along with the ingress port. Any other metadata related to the CCN request can be included. In some embodiments, the additional data is stored in a separate data structure.

The process then continues to generate a modified (first) CCN Name by removing the route transformer identifier from the received (first) CCN Name from the received first CCN request (Block 305). The route transformer identifier may be, for example, a prefix identifying the route transformer. This leaves just the /data portion of the (first) CCN Name that can be used for obtaining the requested content object. This /data portion could include additional route transformer identifiers or can include just a content object name. The process generates a (second) CCN Name from the modified (first) CCN Name (Block 307). The (second) CCN Name includes a content object name or an identifier of another route transformer or similar service. The new (second) CCN Name can then be used to generate a second CCN request (Block 309). A PIT entry may optionally be generated for the second CCN request that includes the (second) (i.e., transformed) CCN Name (Block 311). The PIT entry associates the (first) CCN Name, with the transform configuration and the (second) CCN Name. The transform configuration can have any format and can be stored in the PIT or referenced by the PIT entry. The transform configuration can detail how to 'reverse' or similarly process a CCN reply corresponding to the second CCN request to enable the route transformer to forward the content object returned by the CCN reply toward the originator of the first CCN request, as further described herein below with regard to FIG. 4. The second CCN request is forwarded into the CCN network on an interface toward the next hop according to the standard FIB routing process for CCN networks.

Figure 4:
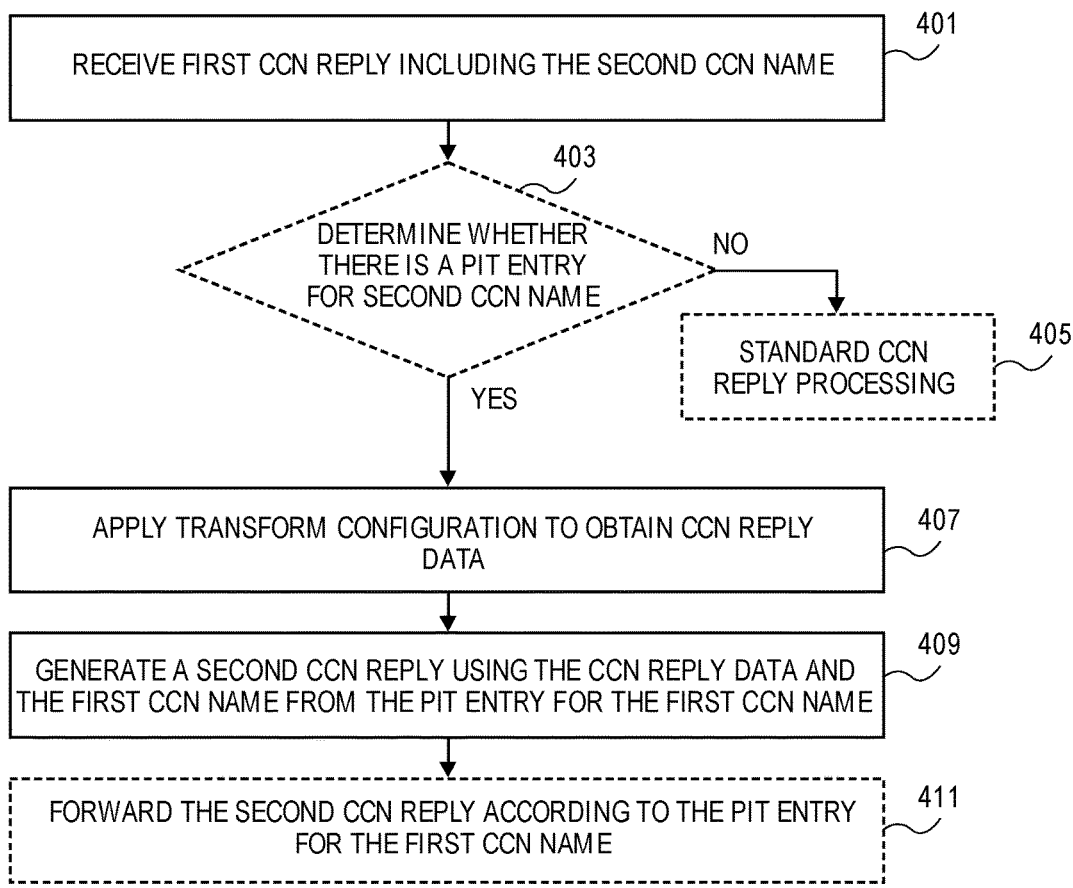
FIG. 4 is a flowchart of one embodiment of a process for a CCN router to perform a route transforming process on a CCN reply.

FIG. 4 is a flowchart of one embodiment of a process for a CCN router to perform a route transforming process on a CCN reply. The process is initiated in response to receiving a CCN reply having a CCN name that matches with a PIT entry identifying that the route transformer generated a corresponding CCN request. Thus, for example, a first CCN reply is received including the (second) CCN Name (Block 401), in reference to the process described above with regard to FIG. 3. The process checks the (second) CCN Name of the first CCN reply against the PIT to determine whether the (second) CCN Name matches a known CCN Name, in particular one relating to the route transforming process, of an existing PIT entry (Block 403). If the (second) CCN Name of the first CCN reply does not match a known CCN Name of any existing PIT entry corresponding to the route transforming process ("NO" branch of Block 403), then the first CCN reply is handled with standard CCN reply processing where the first CCN reply is forwarded according to the lookup of the (second) CCN Name using the FIB (Block 405).

Where a match is found in the PIT for the (second) CCN Name that corresponds to a route transforming process ("YES" branch of Block 403), then the transform configuration of the matching PIT entry is applied to the (second) CCN Name or the data portion thereof (Block 407) to obtain CCN reply data. This can take the form of applying any process or transformation to any portion of the (second) CCN Name such as encrypting the data portion and/or modifying the prefixes to match that of the (first) CCN name to enable the return of the content object to the requester. A second CCN reply is generated using the CCN reply data, as it has been modified by a transform configuration, and the (first) CCN Name from the PIT entry for the (first) CCN Name (Block 409). The second CCN reply may be forwarded according to the interface specified by that PIT entry for the (first) CCN Name (Block 411).

Applications of the Route Transforming Process

As discussed herein above the routing transforming process has a variety of applications including providing the ability to specify a proxy, providing enhanced privacy, policy-based routing and service chaining support.

Proxy

Proxying is one example application of route transformation. This process involves identity mapping. The proxy implementation of a route transformer requests the "route data" as a CCN Name on behalf of the original requester, packages the response into a CCN reply with the requester's URI and this CCN reply is then routed along the path the original CCN request would have traversed by using reverse PIT entries.

If the CCN reply to the transformed CCN Name contains a validation section, then the proxy route transformer must append another validation section of its own. The original requester may then verify the entire chain of trust in that CCN reply once it is received, where the chain of trust extends from the proxy. The verification also determines that the proxy returned the right content object.

Thus, the proxy implementation utilizes the route transformer to redirect requests from the original requester thereby hiding the original requester from the CCN network and/or content server. The original sender uses the proxy service by prepending the prefix of the proxy in the CCN Name of the CCN request. At the route transformer the CCN name is transformed to identify the content object to be obtained for the original requester. Once a CCN reply is returned by the CCN network the content object is sent to the original requester. The transform configuration enables the recreation of the return route to the original requester. This proxy service can be further augmented with the use of a validation section being appended to the CCN Name.

Privacy

By using the public-key infrastructure of a CCN network, an additional level of privacy can be provided to users that are making CCN request queries. It is to be noted that privacy can be applied as an add-on to any of the previous mechanisms. In one example, a CCN Name can designate a proxy privacy route transformer, for example /proxy-private/[/my/object].

The data portion is indicated above as bold and bracketed. This data portion of the CCN Name can be encrypted with Proxy PKI. Once the above CCN request CCN Name is routed to the /proxy-private/ route transformer, the encrypted remainder of the CCN Name can be decrypted using the route transformer's private key, and the regular proxy handling can be performed on the now unencrypted CCN Name to request the object. The privacy function does not have to be realized by a third party such as a proxy; it can be provided on-site, for example by an online bank. To reuse an example from herein above, in the CCN Name /TheBroker[/customer=JohnDoe/buy/stock=ERIC/amount=500], /TheBroker would be visible by eavesdroppers, but the remainder of the CCN Name would be encrypted.

Policy-Based Routing

Figure 5:
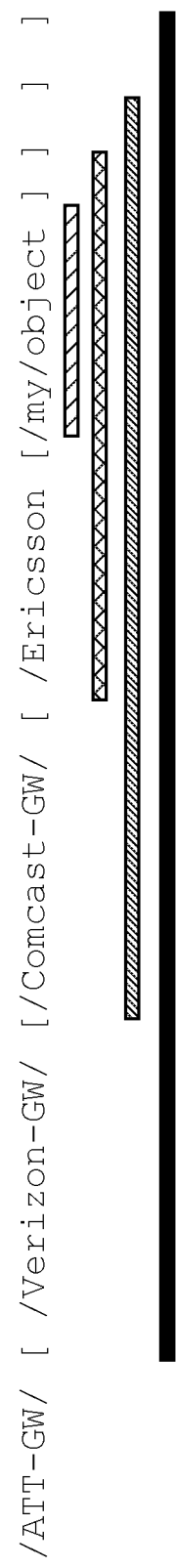
FIG. 5 is a diagram of an example CCN Name including prefixes and content object name for a policy-based routing embodiment.

FIG. 5 is a diagram of an example CCN Name including prefixes and content object name in an example policy-based routing embodiment. It is possible to perform policy-based routing using the route transformer process described herein above by specifying a pre-set path (also known as source routes). For example, the CCN Name of FIG. 5 shows multiple prefixes corresponding to specific nodes through which the CCN request is to be routed based on policies. The CCN Name shows an example of how the CCN request and CCN reply for an object can be routed through specific ISPs. Privacy and anonymity can be added to the request by encrypting recursively the segments of the route. The different shading underlying the different segments of the CCN Name as illustrated in FIG. 5 indicate the (potentially) encrypted segments, where each node can see only one hop ahead. In this example, only the Ericsson domain administrator can see the actual object request here and none of the ISPs can peek into the actual request, providing anonymity and privacy.

Figure 6:
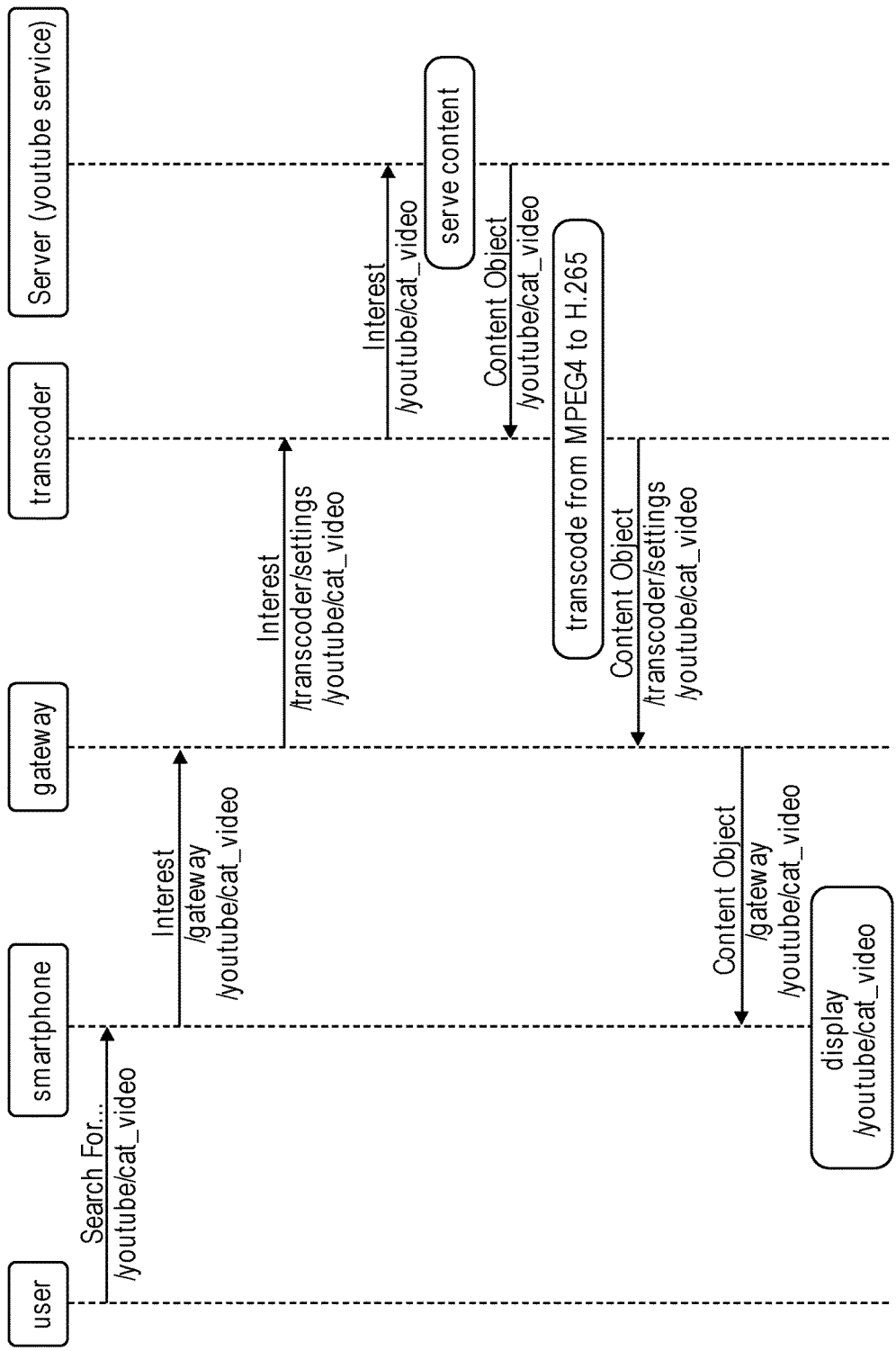
FIG. 6 is a diagram of one embodiment of an example application of the process for route transforming utilized in service chaining.

FIG. 6 is a diagram of one embodiment of an example application of the process for route transforming utilized in service chaining. By extending the 'proxy' case above, it is possible to create a CCN gateway router that handles all outgoing traffic from a network. All CCN requests are directed to the CCN 'gateway' implementing a route transformer via, for example, a route transforming module. Depending on the policy for the (incoming link, destination CCN Name) tuple, the CCN 'gateway' route transformer can use a 'policy-based' route that will dictate the series of services that will transform the actual contents of the originally requested CCN Name.

In the illustrated example the end-user requests a video with the CCN Name /youtube/cat_video. The CCN stack on the user's device is pre-configured to convert this request to /gateway/youtube/cat_video. The CCN 'gateway' route transformer, when it receives the request (in the diagrams 'Interests'), may use a policy specific to the 'youtube' domain, that transcodes the video. This route transformer generates a new CCN Name /transcoder/settings/youtube/cat_video. As described herein above, the CCN 'gateway' route transformer creates an entry in its (extended) PIT table for that new CCN name, and generates a CCN request.

The 'transcoder' route transformer receives the CCN request, and stores the CCN Name '/youtube/cat_video' along with the transcoding settings 'settings,' i.e., a transform configuration. It will now generate a new CCN request for the original CCN Name '/youtube/cat_video.' On receiving a CCN reply, the 'transcoder' route transformer will perform transcoding based on the 'settings,' and generate a new CCN response '/transcoder/settings/youtube/cat_video.' In this example, as in other embodiments, caching would work as in existing CCN networks with this name. The CCN reply reaches the CCN 'gateway' route transformer, via the reverse-path routing typical to existing CCN networks, using PIT entries. The CCN gateway route transformer generates its own CCN reply to the original requestor with the CCN Name '/gateway/youtube/cat_video.'

If the path between the CCN 'gateway' route transformer and the client requestor did not use any caching, the 'settings' can be decided by the CCN 'gateway' route transformer, for example, on-demand. The CCN 'gateway' route transformer could already be caching different objects for different 'settings' variations, and default CCN caching behavior can be used effectively.

Architecture

Figure 7:
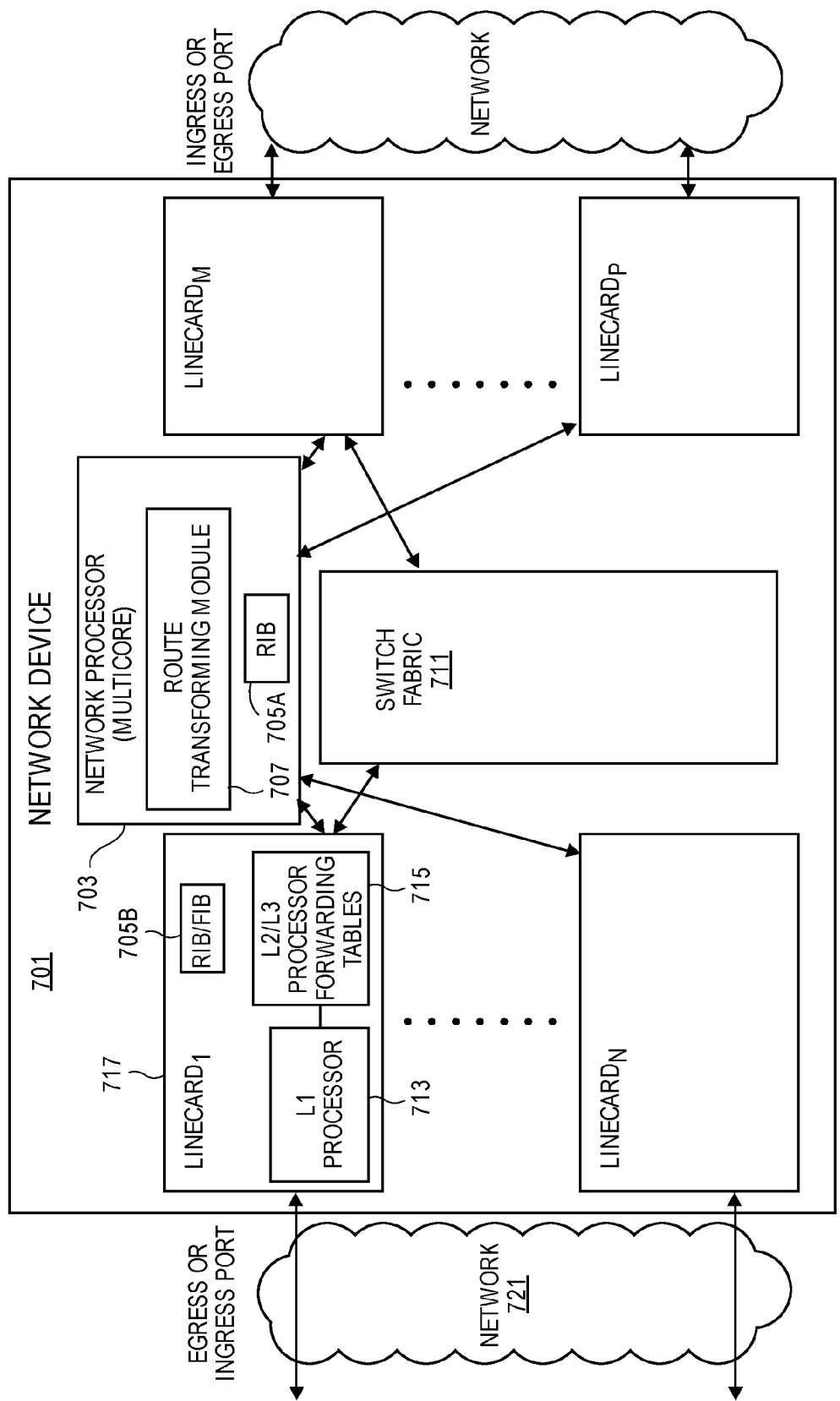
FIG. 7 is a diagram of one embodiment of a network device (ND) implementing a process for route transforming.

FIG. 7 is a diagram of one embodiment of a network device implementing the route transforming process and system. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the route transforming process is implemented by a network device 701 or similar computing device. The network device 701 can have any structure that enables it to receive data traffic and forward it toward its destination. The network device 701 can include a network processor 703 or set of network processors that execute the functions of the network device 701. A 'set,' as used herein, is any positive whole number of items including one item. The network device 701 can execute a route transforming module 707 to implement the functions for processing CCN requests and replies as described herein above via a network processor 703.

The network device 701 connects with separately administered networks that have user equipment and/or content servers. The network processor 703 can implement the route transforming module 707 as a discrete hardware, software module or any combination thereof. The network processor 703 can also service the routing information base 705A and similar functions related to data traffic forwarding and network topology maintenance. The routing information base 705A can be implemented as match action tables that are utilized for forwarding protocol data units PDUs (i.e. packets). The functions of the route transforming module 707 can be implemented as modules in any combination of software, including firmware, and hardware within the network device. The functions of the route transforming module 707 that are executed and implemented by the network device 701 include those described further herein above.

In one embodiment, the network device 701 can include a set of line cards 717 that process and forward the incoming data traffic toward the respective destination nodes by identifying the destination and forwarding the data traffic to the appropriate line card 717 having an egress port that leads to or toward the destination via a next hop. These line cards 717 can also implement the forwarding information base 705B, or a relevant subset thereof. The line cards 717 can also implement or facilitate the route transforming module 707 functions described herein above. The line cards 717 are in communication with one another via a switch fabric 711 and communicate with other nodes over attached networks 721 using Ethernet, fiber optic or similar communication links and media.

The operations of the flow diagrams have been described with reference to the exemplary embodiment of the block diagrams. However, it should be understood that the operations of the flowcharts could be performed by embodiments of the invention other than those discussed, and the embodiments discussed with reference to block diagrams can perform operations different from those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the network device 701 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices. One or more parts of an embodiment of the invention may be implemented using different combinations of software, firmware, and/or hardware.

FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 800A, E, and F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated circuits (ASICs) and a proprietary operating system (OS); and 2) a general-purpose network device 804 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A). In some embodiments, the control communication and configuration module 832A encompasses the route transforming module 833A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 802 is often physically and/or logically considered to include: 1) a ND control plane 824 (sometimes referred to as a control plane) comprising the compute resource(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) (i.e. implemented as match action tables) 834A-R and the physical NIs 816. By way of example, where the ND is a router (or is implementing routing functionality), the ND control plane 824 (the compute resource(s) 812 executing the control communication and configuration module(s) 832A-R) is typically responsible for participating in controlling how data (e.g., packets) are to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850. During operation, the processor(s) 842 execute the software 850 to instantiate a hypervisor 854 (sometimes referred to as a virtual machine monitor (VMM)) and one or more virtual machines 862A-R that are run by the hypervisor 854, which are collectively referred to as software instance(s) 852. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 862A-R, and that part of the hardware 840 that executes that virtual machine (be it hardware dedicated to that virtual machine and/or time slices of hardware temporally shared by that virtual machine with others of the virtual machine(s) 862A-R), forms a separate virtual network element(s) 860A-R. In some embodiments, the virtual machine module 862A encompasses rout transforming module 864A.

The virtual network element(s) 860A-R perform similar functionality to the virtual network element(s) 830A-R. For instance, the hypervisor 854 may present a virtual operating platform that appears like networking hardware 810 to virtual machine 862A, and the virtual machine 862A may be used to implement functionality similar to the control communication and configuration module(s) 832A and forwarding table(s) 834A (this virtualization of the hardware 840 is sometimes referred to as network function virtualization (NFV)). In some embodiments, the virtual machine 862A encompasses the route transforming module 864A as described herein above. Thus, NFV may be used to consolidate many network equipment types onto industry standard high volume server hardware, physical switches, and physical storage, which could be located in Data centers, NDs, and customer premises equipment (CPE). However, different embodiments of the invention may implement one or more of the virtual machine(s) 862A-R differently. For example, while embodiments of the invention are illustrated with each virtual machine 862A-R corresponding to one VNE 860A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 854 includes a virtual switch that provides similar forwarding services as a physical Ethernet switch. Specifically, this virtual switch forwards traffic between virtual machines and the NIC(s) 844, as well as optionally between the virtual machines 862A-R; in addition, this virtual switch may enforce network isolation between the VNEs 860A-R that by policy are not permitted to communicate with each other (e.g., by honoring virtual local area networks (VLANs)).

The third exemplary ND implementation in FIG. 8A is a hybrid network device 806, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content server or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the virtual machines 862A-R may operate as servers; the same would be true for the hybrid network device 806; in the case of the special-purpose network device 802, one or more such servers could also be run on a hypervisor executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments of the invention. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (as well as RSVP-Traffic Engineering (TE): Extensions to RSVP for LSP Tunnels, Generalized Multi-Protocol Label Switching (GMPLS) Signaling RSVP-TE) that communicate with other NEs to exchange routes, and then selects those routes based on one or more routing metrics. Thus, the NEs 870A-H (e.g., the compute resource(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R that are implementations of match action tables (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs.

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the compute resource(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach). In some embodiments, the centralized reachability and forwarding module 879 encompasses route transforming functions in route transforming module 881 as described herein above.

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The application layer 886 thus enables the execution of applications that manage or interact with the functions associated with the network elements.

While FIG. 8D shows the distributed approach 872 separate from the centralized approach 874, the effort of network control may be distributed differently or the two combined in certain embodiments of the invention. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 8701 in one of the virtual network(s) 892 of FIG. 8D, according to some embodiments of the invention. FIG. 8E shows that in this virtual network, the NE 8701 is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
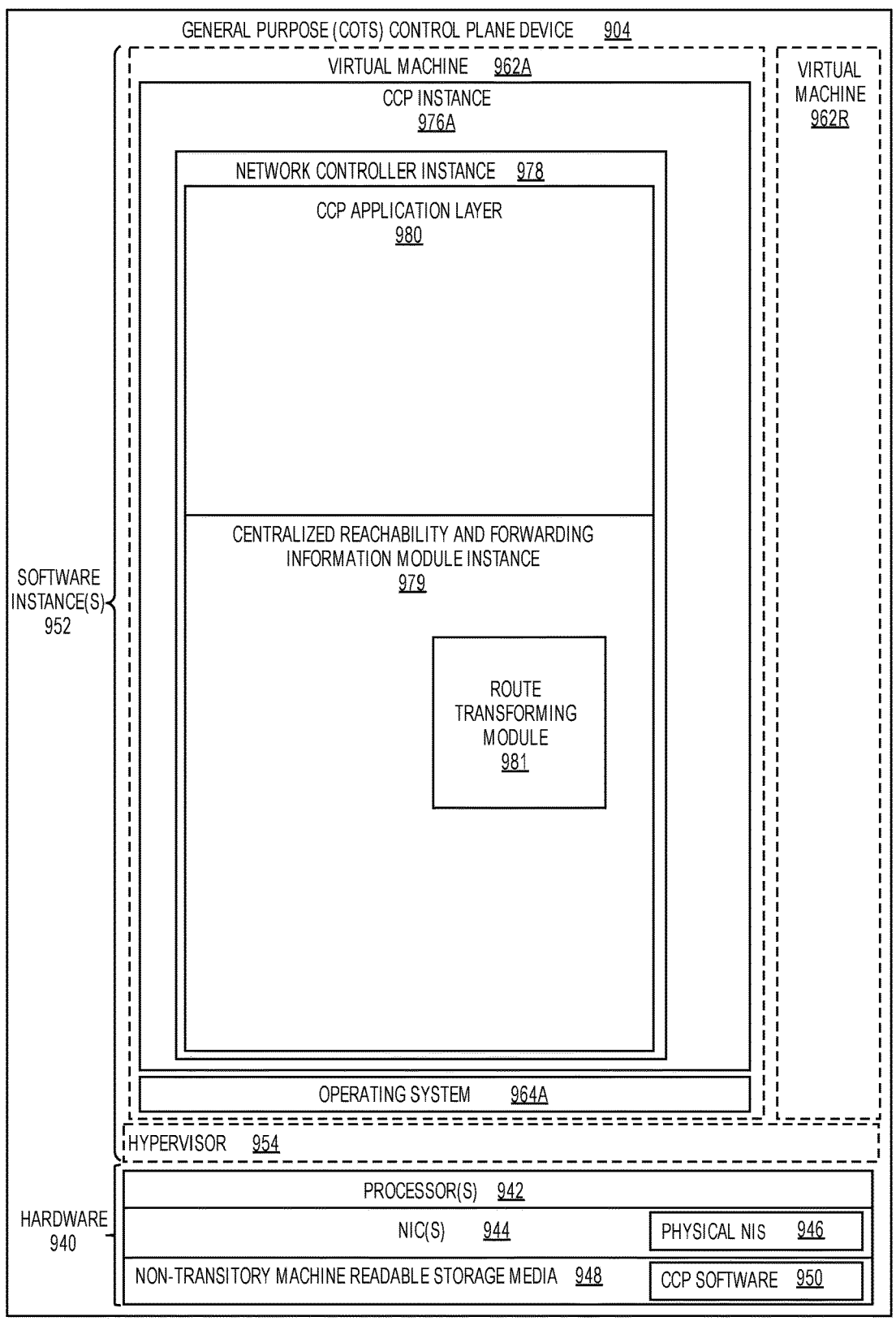
FIG. 9 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein centralized control plane (CCP) software 950.

In embodiments that use compute virtualization, the processor(s) 942 typically execute software to instantiate a hypervisor 954 (sometimes referred to as a virtual machine monitor (VMM)) and one or more virtual machines 962A-R that are run by the hypervisor 954; which are collectively referred to as software instance(s) 952. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 950 (illustrated as CCP instance 976A) on top of an operating system 964A are typically executed within the virtual machine 962A. In embodiments where compute virtualization is not used, the CCP instance 976A on top of operating system 964A is executed on the "bare metal" general purpose control plane device 904.

The operating system 964A provides basic processing, input/output (I/O), and networking capabilities. In some embodiments, the CCP instance 976A includes a network controller instance 978. The network controller instance 978 includes a centralized reachability and forwarding information module instance 979 (which is a middleware layer providing the context of the network controller 978 to the operating system 964A and communicating with the various NEs), and an CCP application layer 980 (sometimes referred to as an application layer) over the middleware layer (providing the intelligence required for various network operations such as protocols, network situational awareness, and user-interfaces). At a more abstract level, this CCP application layer 980 within the centralized control plane 976 works with virtual network view(s) (logical view(s) of the network) and the middleware layer provides the conversion from the virtual networks to the physical view. The CCP application can encompass the functionality of the route transforming module 981 as described herein above.

The centralized control plane 976 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for route transforming by a network device implementing a content centric networking (CCN) gateway or CCN router, where the CCN gateway or CCN router is part of a CCN network, the method to handle a first CCN reply before forwarding a second CCN reply in the CCN network, the method comprising:
   receiving the first CCN reply including a second CCN Name;
   applying a transform configuration to the second CCN Name to obtain CCN reply data; and
   generating the second CCN reply using the CCN reply data and a first CCN Name from a pending interest table (PIT) entry for the first CCN Name.

2. The method of claim 1, further comprising:
   determining whether a PIT entry exists for the second CCN Name.

3. The method of claim 1, further comprising:
   forwarding the second CCN reply according to the PIT entry for the first CCN Name.

4. The method of claim 1, wherein the PIT entry associates the first CCN Name, a transform configuration, and the second CCN Name.

5. The method of claim 1, the method further to transform the first CCN Name in a CCN request before forwarding in the CCN network, the method further comprising:
   receiving a first CCN request including the first CCN Name, the first CCN Name including a route transformer identifier, the route transformer identifier to identify a first process for modifying the first CCN Name; and
   generating a modified first CCN Name by removing the route transformer identifier from the first CCN Name.

6. A network device to implement a method for route transforming, the network device in a content centric networking (CCN) gateway or CCN router, where the CCN gateway or CCN router is part of a CCN network, the method to handle a first CCN reply before forwarding a second CCN reply in the CCN network, the network device comprising:
   a non-transitory computer-readable medium having stored therein a route transforming module; and
   a processor coupled to the non-transitory computer-readable medium, the processor configured to execute the route transforming module, the route transforming module configured to receive the first CCN reply including a second CCN Name, to apply a transform configuration to the second CCN Name to obtain CCN reply data, and generate the second CCN reply using the CCN reply data and a first CCN Name from a pending interest table (PIT) entry for the first CCN Name.

7. The network device of claim 6, wherein the route transforming module is further configured to determine whether a PIT entry exists for the second CCN Name.

8. The network device of claim 6, wherein the route transforming module is further configured to forwarding the second CCN reply according to the PIT entry for the first CCN Name.

9. The network device of claim 6, wherein the PIT entry associates the first CCN Name, a transform configuration, and the second CCN Name.

10. The network device of claim 6, the network device further configured to transform the first CCN Name in a CCN request before forwarding in the CCN network, by receiving a first CCN request including the first CCN Name, the first CCN Name including a route transformer identifier, the route transformer identifier to identify a first process for modifying the first CCN Name, and generating a modified first CCN Name by removing the route transformer identifier from the first CCN Name.

11. A computing device to execute a plurality of virtual machines for implementing network function virtualization (NFV), wherein a virtual machine from the plurality of virtual machines is configured to implement a method for route transforming, the computing device in a content centric networking (CCN) gateway or CCN router, where the CCN gateway or CCN router is part of a CCN network, the method to handle a first CCN reply before forwarding a second CCN reply in the CCN network, the computing device comprising:
 a non-transitory computer-readable medium having stored therein a route transforming module; and
 a processor coupled to the non-transitory computer-readable medium, the processor configured to execute the virtual machine, the virtual machine configured to execute the route transforming module, the route transforming module configured to receive the first CCN reply including a second CCN Name, to apply a transform configuration to the second CCN Name to obtain CCN reply data, and generate the second CCN reply using the CCN reply data and a first CCN Name from a pending interest table (PIT) entry for the first CCN Name.

12. The computing device of claim 11, wherein the route transforming module is further configured to determine whether a PIT entry exists for the second CCN Name.

13. The computing device of claim 11, wherein the route transforming module is further configured to forwarding the second CCN reply according to the PIT entry for the first CCN Name.

14. The computing device of claim 11, wherein the PIT entry associates the first CCN Name, a transform configuration, and the second CCN Name.

15. The computing device of claim 11, the computing device further configured to transform the first CCN Name in a CCN request before forwarding in the CCN network, by receiving a first CCN request including the first CCN Name, the first CCN Name including a route transformer identifier, the route transformer identifier to identify a first process for modifying the first CCN Name, and generating a modified first CCN Name by removing the route transformer identifier from the first CCN Name.

16. A control plane device configured to implement a control plane of a software defined networking (SDN) network including a plurality of network devices forming a content centric network, the control plane device implementing a method for route transforming, the control plane device in communication with a content centric networking (CCN) gateway or CCN router, where the CCN gateway or CCN router is part of a CCN network, the method to handle a first CCN reply before forwarding a second CCN reply in the CCN network, the control plane device comprising:
 a non-transitory computer-readable medium having stored therein a route transforming module; and
 a processor coupled to the non-transitory computer-readable medium, the processor configured to execute the route transforming module, the route transforming module configured to receive the first CCN reply including a second CCN Name, to apply a transform configuration to the second CCN Name to obtain CCN reply data, and generate the second CCN reply using the CCN reply data and a first CCN Name from a pending interest table (PIT) entry for the first CCN Name.

17. The control plane device of claim 16, wherein the route transforming module is further configured to determine whether a PIT entry exists for the second CCN Name.

18. The control plane device of claim 16, wherein the route transforming module is further configured to forwarding the second CCN reply according to the PIT entry for the first CCN Name.

19. The control plane device of claim 16, wherein the PIT entry associates the first CCN Name, a transform configuration, and the second CCN Name.

20. The control plane device of claim 16, the control plane device further configured to transform the first CCN Name in a CCN request before forwarding in the CCN network, by receiving a first CCN request including the first CCN Name, the first CCN Name including a route transformer identifier, the route transformer identifier to identify a first process for modifying the first CCN Name, and generating a modified first CCN Name by removing the route transformer identifier from the first CCN Name.

* * * * *